United States Patent [19]

Braga

[11] 4,186,852
[45] Feb. 5, 1980

[54] APPARATUS FOR MELTING AND EXTRUDING THERMOFUSIBLE MATERIAL

[75] Inventor: Luigi F. Braga, Milan, Italy

[73] Assignee: Viscodynamics Corporation, Bure, Switzerland

[21] Appl. No.: 803,146

[22] Filed: Jun. 3, 1977

[30] Foreign Application Priority Data

Jun. 7, 1976 [IT] Italy .............................. 24007 A/76

[51] Int. Cl.² .......................... B67D 5/62; G01F 11/22
[52] U.S. Cl. .............................. 222/146 HE; 222/229; 222/240; 222/333; 222/375; 222/413; 366/79; 425/209; 425/564
[58] Field of Search ................. 222/146 HE, 229, 239, 222/240-242, 413, 333, 375, 380; 425/208, 551, 563, 564, 561; 366/79

[56] References Cited

U.S. PATENT DOCUMENTS

| | | | |
|---|---|---|---|
| 1,977,515 | 10/1934 | Klippel | 425/551 X |
| 2,694,509 | 11/1954 | Vita | 222/413 X |
| 3,327,903 | 6/1967 | Waller | 222/241 X |
| 3,508,687 | 4/1970 | Burgstaller | 222/241 X |
| 3,550,815 | 12/1970 | Salonen | 222/146 HE |
| 3,739,958 | 6/1973 | York | 222/413 |
| 3,913,799 | 10/1975 | Davis | 222/333 X |
| 3,954,206 | 5/1976 | Salonen | 222/148 HE |

FOREIGN PATENT DOCUMENTS 559108  7/1957 Belgium ..................... 222/413

Primary Examiner—Charles A. Marmor
Attorney, Agent, or Firm—Bucknam and Archer

[57] ABSTRACT

An apparatus for the extrusion of thermofusible materials which are applied while being heated comprises a prefusion and feeding chamber, a heating element for the prefusion and feeding chamber, a shaft capable of rotation at the base of the chamber, the shaft while in rotation mixing the thermofusible material and an extruder comprising an extrusion screw axially connected to said shaft. The extrusion screw is located in a cylindrical tubular structure which is provided with an exit for the thermofusible material. Preferably the shaft is located at a predetermined distance from the bottom wall of the prefusion chamber whereby a passageway is formed between the bottom wall and the shaft, the chamber and the shaft being so dimensioned that the shaft during rotation forces the entire mass of thermofusible material through the passageway. The shaft preferably comprises a first cylindrical portion and a second portion in the form of a helicoidal screw, the diameter of the helicoidal screw being greater than the diameter of the first extrusion screw. According to one embodiment, the apparatus is portable, the prefusion chamber is cylindrical and is provided with a conical base and the shaft is located tangentially to a generatrix of the conical base. The apparatus may be of the gun type. It may be provided with a device for preventing the flow of the material when the apparatus is not in operation.

8 Claims, 3 Drawing Figures

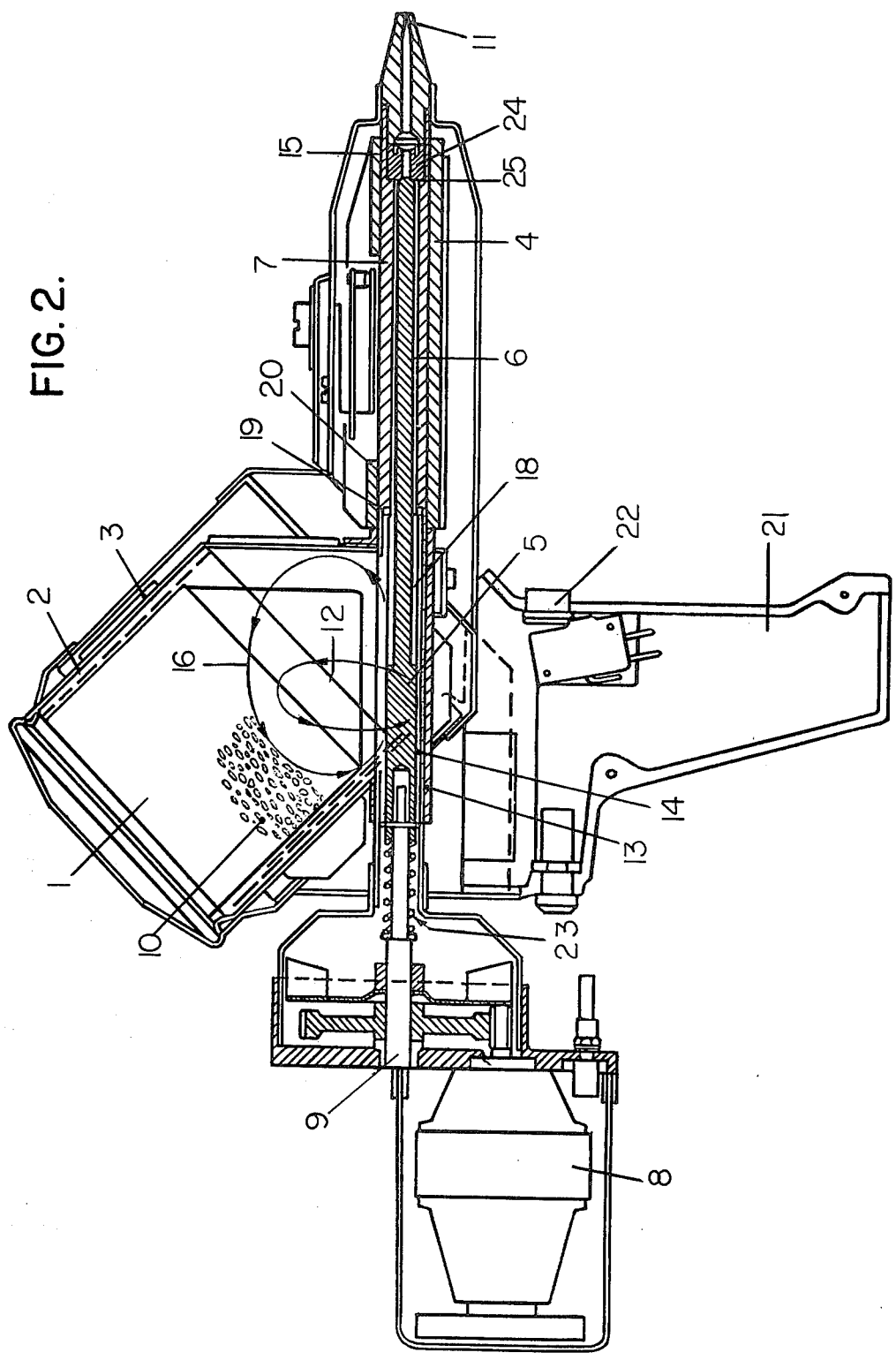

APPARATUS FOR MELTING AND EXTRUDING THERMOFUSIBLE MATERIAL

The present invention relates to an apparatus for the application of thermofusible substances and more specifically to an apparatus which permits the rapid fusion of any thermofusible substance and the simultaneous application at a predetermined spot.

Thermofusible substances depending upon their formulation serve in a variety of applications, for instance as adhesives, sealing substances, pressure-sensitive adhesives, for the purpose of soldering metals with alloys having a low melting point and similar substances.

Among the thermofusible substances, adhesives which are used while heated, usually referred to as "hot melt" adhesives, containing synthetic thermoplastic substances have acquired particular importance. In actual practice, the devices and apparatuses used for the application of these substances operate substantially by melting these substances, reducing the viscosity of the substances by initially suitably raising the temperature and then applying the substances by heating at a predetermined spot where the substances are then cooled so that they set. With this type of apparatus the delivery of the thermofusible material is achieved by means of compressed air or by means of pumps which generally are provided with gears or equivalent devices. With these apparatuses, it is however, difficult to achieve in a simple manner a high rate of production and it is difficult to avoid the occlusion of gas in the thermoplastic substances. In addition, the step of pumping substances of high viscosity is usually accompanied by substantial difficulties because there is a difficulty in feeding the materials to the pumps. In actual practice, therefore, the construction of an apparatus according to the usual criteria which are used in the construction of conventional apparatuses, is not simple, particularly in the case of an apparatus of the portable type if the apparatus is to be suitable for the use of materials having high viscosity, for instance in the order of 100,000 centipoises and even higher. The latter substances in fact should be heated at a relatively high temperature with the consequent possibility of structural degradation in many of them, particularly if they are organic substances.

One object of the present invention is to provide an apparatus which overcomes the functional limitations described hereinabove in the application of thermofusible substances of the type used while heated and particularly substances which are adhesives of the "hot melt" type.

Another object of the present invention is to provide an apparatus which permits to melt and to apply the thermofusible substances in a simple manner at a lower temperature with the same type of adhesive being used, no matter what is the viscosity of the material itself.

More specifically the apparatus in accordance with the present invention suitable for the application of adhesives which are being applied while heated and similar apparatuses essentially consists of a prefusion chamber of a suitable shape, which is heated and which is provided at the bottom with a shaft capable of rotation, the shaft carrying axially an extrusion screw.

This screw is located in a tubular cylindrical structure which initially has a greater internal diameter so as to cause the recycling of a portion of the material in the fused state and also to cause the passage of the remainder of the substance into the screw so that an adequate amount of material is in every instance introduced into the screw. The recycling of the fused material permits mixing of the fused material with the material still to be fused so that rapid fusion and homogenization is achieved even in the case of materials which are very viscous and poor heat conductors.

The elements of the apparatus mentioned hereinabove in addition may be so assembled and so dimensioned to give a portable apparatus of the gun type, which is provided with means for holding the material when the motor is not in operation.

These characteristic features of the present invention of both functional and structural nature for the application of thermofusible substances may be better appreciated from an examination of the accompanying drawings.

Figures 1A, 1B:
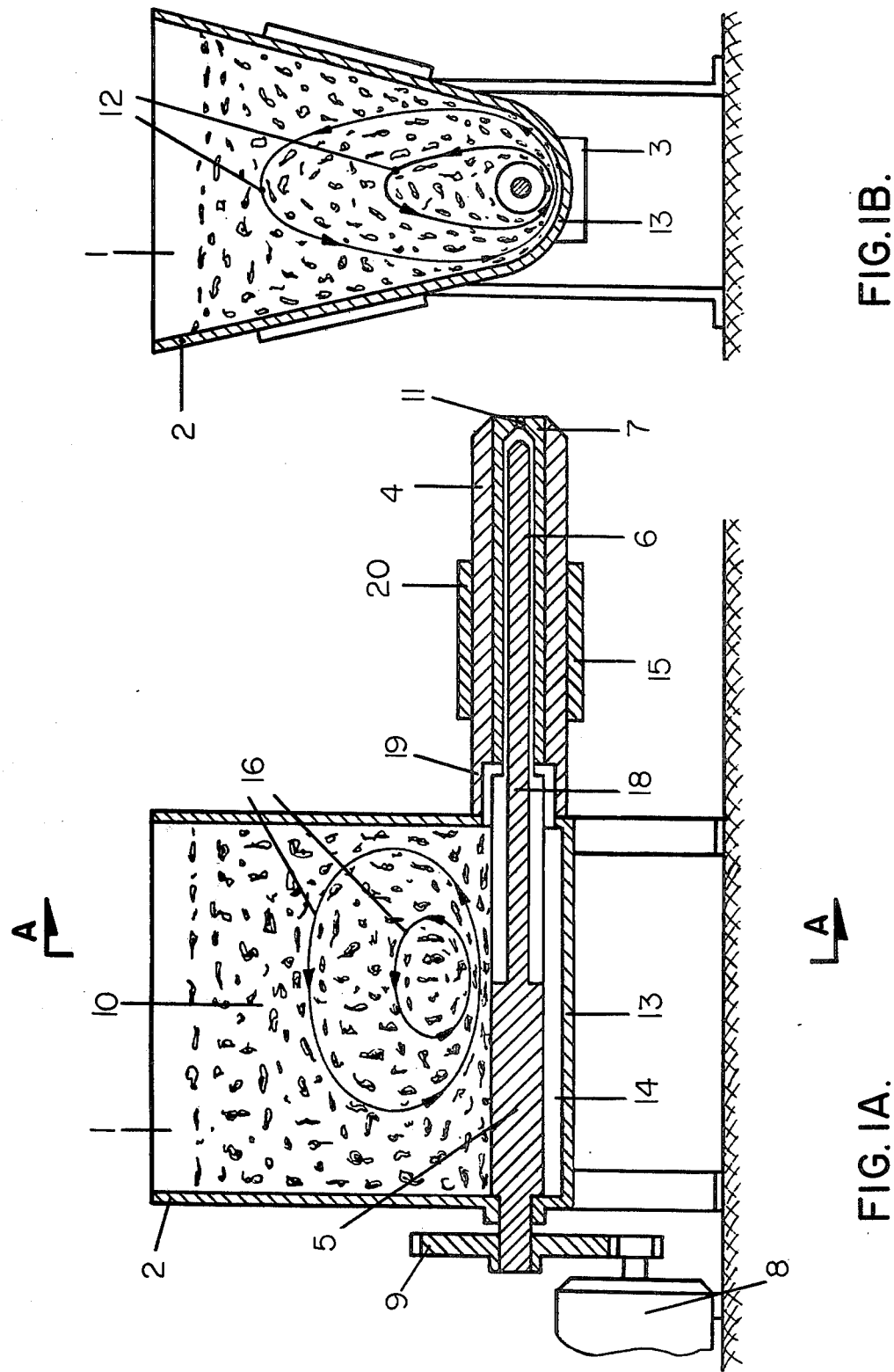
FIG. 1a illustrates the apparatus according to the invention in longitudinal section
FIG. 1b is a transversal section of the apparatus of FIG. 1a FIG. 2 which illustrates an embodiment of a portable apparatus in longitudinal section.

With particular reference to the numerals in the drawings, the apparatus for the application of adhesives in the presence of a source of heat consists of prefusion chamber 1, the walls of which 2 are heated by suitable means at the predetermined temperature by heating means, for instance electric resistance heating elements 3 which are thermostatically controlled.

This chamber serves as the feeding means for the extrusion device 4. The motor shaft 5 goes through a substantial portion of the chamber. The motor shaft 5 serves along the same portion as mixing means for the thermofusible material.

The extrusion device 4 consists of a helicoidal screw which is enclosed in a jacket 7 and which is driven through shaft 5 mentioned hereinabove by motor 8. The latter by means of reduction gearing 9 sets the shaft in rotation. The latter completes the fusion of the material 10, carries away the portion which has been melted and directs it under pressure through the screw 6 to the delivery point 11. The rotation of the same shaft 5, which, in practice is immersed in a thermofusible material 10, allows to achieve a continuous mixing of the same material.

It should be noted further than the apparatus of this application permits to improve the transmission of heat between walls 2 of prefusion chamber 1 and the thermofusible material 10 mentioned hereinabove. The same shaft 5 in fact carries the material with which it comes in contact by adherence due to the viscosity of the material, while the shaft is rotated. The material itself which is in contact with the shaft causes a rotational motion of the material which is adjacent to it which is in the course of being fused, gives rise to eddies 12 in the same material and consequently carries new material continuously in contact with the walls 2 which are being heated. During such a motion, in particular the material which was previously fused wets the granules and the flakes of the material which has not yet fused, causes the homogenization of the mass so treated both from a thermic point of view as well as in regard to the overall intimate mixing of the material which is being fused.

In view of the preliminary effect of homogenization discussed hereinabove, it is possible to feed into the prefusion chamber 1 thermofusible materials of very low coefficient of thermal conductivity and also materials which are not completely homogenized of the type of compounded substances.

The apparatus of the present invention may also be used to fuse and apply, if it is manufactured with suitable substances, inorganic substances such as alloys of low fusion point, inorganic salts and their mixtures and similar substances.

It is possible to achieve in the prefusion chamber in practice an uninterrupted recycling of the thermofusible material with continuous removal of a certain proportion of the fused mass. Consequently it is possible to maintain the temperature of the walls 2 of the prefusion chamber not above a predetermined value. This possibility is particularly advantageous for the treatment of thermoplastic substances which are sensitive to oxidation or which are subject to other forms of degradation when they are exposed to high temperatures. As a result of the rotational motion discussed hereinabove which is imparted to the mass being fused, it is possible to achieve a substantial acceleration of the fusion process itself which in practice instead of being static, becomes dynamic. In fact the fused portion of the mass of the thermoplastic substance under the effect of the slow whirling motion to which the entire mass is subjected, in addition to wetting the pellets or the chips which still have not been fused, eliminates air present between the small particles and incorporates the same particles in a pasty mass which is rapidly fused.

The whirling motion which takes place in the interior of the material 10 further permits to treat easily also charges of very viscous substances which otherwise not only would be difficult to handle to achieve fusion but which might also present the difficulty of discontinuous delivery due to the possible inclusion of air bubbles or due to the formation of voids or bridges.

It is proper to note further that in conventional extrusions practically the entire heat necessary for the heating step and for the fusion of the material must be provided in the form of work carried out by the screw, that is in the form of mechanical energy so that the power of the motor, the weight and the cost of the extruder are high. On the other hand in the apparatus in accordance with the present invention the greater part of the required heat is supplied to the prefusion chamber by means other than mechanical energy so that energy absorbed by the motor 8 and by the extruder 6 is low and consequently also the weight and the cost remains low, other conditions remaining the same.

The proportion of mechanical energy which is transformed into heat in the extruder 6 in any event is sufficient to raise the temperature of the mass in the screw of the extruder of a few tens of degrees centigrade, the mass having already been fused in the prefusion chamber. Eventually this temperature may also be increased by application of electric resistance heating elements 15 on the jacket 7 of the extruder. Consequently, it is possible to keep the temperature of the walls 2 of the prefusion chamber itself lower under equal conditions of the final temperature of the material at the delivery point 11 and consequently avoid the formation of hot spots.

It should be also noted that this final increase of the temperature of the thermofusible material takes place when the material itself has already been degasified and therefore it is not in contact with air. The thermofusible material remains, therefore, at the higher temperature of delivery only for the period of time which is strictly necessary.

According to one embodiment of the invention and in order to achieve a superior operation of the apparatus, it is advantageous to place the shaft 5 of the extruder at a small distance, for instance 5–10 mm, from the bottom wall 13 of the prefusion chamber. In this manner under the effect of the rotation of the shaft itself, the material is carried by adherence and is forced to pass in the slot 14 which remains between the shaft and the wall, thus being subjected to a drawing step, that is a step analogous to the phenomenon which occurs when metals and plastic substances are forced through a roll mill.

The step of forcing the material in particular to travel in a certain direction may start when the mass being treated is a little sticky, that is much earlier than the time when the same mass has reached the fusion temperature.

The material which has been forced in a certain direction and which has been softened is subsequently brought under the effect of the rotation of the shaft 5 in contact with the material charged into the prefusion chamber 1.

The proportion of the material which is forced to pass in a certain direction and which is therefore recycled, may be very substantial with respect to the capacity of the apparatus and may be largely predetermined by varying in suitable manner the rate of travel and the configuration of the apparatus itself.

It is particularly possible to select the dimensions of the shaft 5, of the extruder and prefusion chamber 1 in such a manner that the rotation of the shaft itself carries in slow motion the entire mass of the thermofusible substance 10 which is contained in the prefusion chamber 1. The same shaft 5, further, may be so shaped that it confers to the fluid mass also an axial motion designated by numeral 16 which is combined with the tangential motion mentioned hereinabove. For this purpose shaft 5 may be built for instance in two portions, the first portion being cylindrical and the second portion designated by numeral 18 being in the form of a helicoidal screw, of suitable direction, the latter being capable of forcing the material towards the extruder 4. The diameter and the capacity of the screw of the above mentioned second portion in particular must be such as to be suitably superior to the diameter and capacity of the screw 6 of the extruder so that the material being fed to the same extruder is always kept in excess. This helicoidal screw provides for axial recycling of the thermofusible material.

The rate of axial recycling with respect to the capacity of the extruder in any event is generally lower than the rate of tangential recycling.

According to a further embodiment of the invention, it is possible to improve the apparatus by manufacturing the cylinder of the extruder 4 in two portions which are designated respectively by numerals 19 and 20 and which have a different diameter. The first portion serves as charging zone while the second portion serves as the extruder cylinder proper. More specifically the first portion 19 has an interior diameter which is greater than the second portion 20 and further the first portion 19 engages the last portion 18 of the shaft by means of a screw which also has a greater diameter, along a length of about two or three turns. The material carried along screw 18 is forced along the first portion 19 of the extrusion cylinder. Part of this material is carried by screw 6 of the extruder towards the nozzle 11 while the excess material is recycled into the prefusion chamber 1.

According to one embodiment of the invention the apparatus may be built in a portable form as it is schematically illustrated in FIG. 2. The prefusion chamber 1 is built with a cylindrical configuration, with conical base so that the shaft 5 results located tangentially to a generatrix of the conical part itself. This configuration of the prefusion chamber permits the shaft 5 to force the material during the course of the fusion into the slot 14 and, further, to carry because of adherence the entire mass of the material which is contained in the prefusion chamber itself. The material rotates around the geometric axis of the cylindrical chamber which has a conical base. This feature of forcing the entire mass of material may be achieved because of the particular configuration of this prefusion chamber also without giving rise to internal deformations of the mass and this occurs even when the mass in not yet fused.

The particular conformation of the prefusion chamber mentioned hereinabove presents, therefore, the advantage of initiating the mixing in advance with respect to other forms of prefusion chambers which have different shapes, without leaving dead corners. The same prefusion chamber of the shape mentioned hereinabove permits in addition to feed the apparatus with whole blocks of pressure-sensitive material, of suitable dimensions, which cannot be fed in pellets or chips form because they are sticky even at room temperature and have the tendency of forming agglomerates.

The shaft 5 causes these whole blocks to rotate even in the solid state and as a result the blocks are fused on the surface of the heated walls so that they are delivered by the helicoidal section 18 of the shaft progressively until the material is used up.

Figure 3:
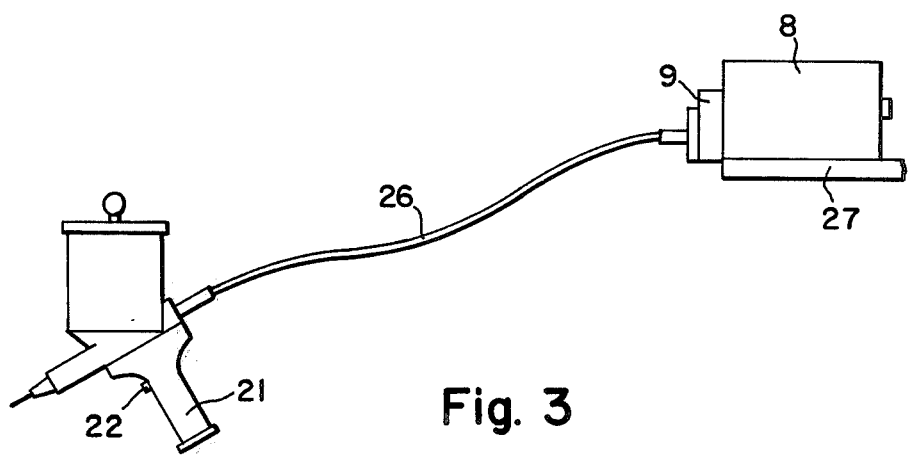
FIG. 3 illustrates another embodiment of the invention.

The embodiment of the portable apparatus is provided in addition with a hand grip 21, trigger 22 which permits to operate and control the motor 8 when one desires to make the material come out from the nozzle 11. In addition in this portable shape the gear motor 8 and reduction gearing 9 may be separated from the body of the gun itself and may be connected to it by means of a flexible shaft. FIG. 3 illustrates this embodiment. Numeral 8 is the motor fixed on support 27. Numeral 9 is the reduction gearing or bear box. Numeral 26 is the flexible shaft which connects the motor to the gun 21, the latter being provided with trigger 22.

With this arrangement the gear motor which is heavier remains fixed and the gun part may be substantially lighter in weight and easier to handle.

Due to the arrangement of the apparatus in the portable form which is normally inclined forwardly and which is essentially built in the shape of a gun, it is advisable to provide a system for the purpose of retaining the material so that the material does not exit from nozzle 11 when the motor is not in operation. This system may be obtained preferably by means of spring 23 which normally urges forwardly on the tip of the screw 6, the latter being capable to plug the orifice of the dowel 24. When the motor 8 causes the screw 6 to rotate, the material in the compartment 25 is under pressure. This pressure causes the screw 6 to retract so that the spring 23 is compressed and the orifice of the dowel 24 is opened and this permits the flow of the material through nozzle 11.

On the other hand, when screw 6 ceases to rotate, the pressure in compartment 25 drops and, therefore, spring 23 pushes the screw 6 forwardly and the screw closes the orifice of the dowel 24 so that it prevents the material from dripping.

On the basis of the foregoing description and the figures, it is clear that the present invention is simple in actual operation and is very versatile and may be used with a variety of thermofusible materials. It is also manifest that the apparatus according to this invention and the method of application have been described merely for the purpose of illustration and that the scope of the present invention is not limited by the above description. It is, therefore, to be understood that the apparatus for the application of thermofusible materials and the method according to which the apparatus is used may be modified in accordance with the various requirements of manufacturing and specific practical use in each instance and that improvements may be made. These variations and improvements which may be in the construction and/or in the assembly of the parts of the apparatus still fall within the scope of the present invention.

What is claimed is:

1. An apparatus for the continuous melting and extrusion of thermofusible materials which are poor conductors of heat, which comprises a feeding and a prefusion chamber, means for heating said feeding and prefusion chamber, a shaft capable of rotation at the base of said chamber and located along a substantial portion thereof, said shaft while in rotation mixing and recycling said thermofusible material, means for activating said shaft, said shaft comprising a first cylindrical portion and a second portion in the form of a first helicoidal screw, extrusion means comprising an extrusion screw axially connected to said shaft, said extrusion screw being located in a cylindrical tubular structure extending from said chamber, exit means for the thermofusible material in said cylindrical tubular structure, said extrusion screw comprising a second helicoidal screw, said first helicoidal screw being of greater diameter than said second helicoidal screw, said cylindrical tubular structure being divided into two portions, the first portion engaging said first helicoidal screw and being of greater internal diameter than the second portion, whereby at least a portion of said thermofusible material is axially recycled to said feeding and prefusion chamber, prior to reaching said second helicoidal screw.

2. The apparatus according to claim 1 wherein means are provided for heating said cylindrical tubular structure.

3. The apparatus according to claim 1 wherein said shaft is located at a predetermined distance from the bottom wall of said feeding and prefusion chamber whereby a passageway is formed between the said bottom wall and said shaft, said chamber and said shaft being so dimensioned that the shaft during rotation forces a portion of the thermofusible material through said passageway, the fused material being recycled through said passageway and being mixed with material to be fused.

4. The apparatus according to claim 1 wherein said feeding and prefusion chamber is cylindrical and is provided with a conical base and said shaft is located about parallel to a generatrix of said conical base.

5. The apparatus according to claim 1 which is provided with a motor for activating said extrusion screw, said apparatus being of the gun type.

6. The apparatus according to claim 5 wherein said motor is separated from the body of said gun by means of a flexible shaft.

7. The apparatus according to claim 3 wherein said shaft is located at a distance of about 5-10 mm from the bottom wall of said prefusion chamber.

8. The apparatus according to claim 1 wherein said shaft is adapted to move axially rearwardly and forwardly, the apparatus is provided with means for preventing the flow of material when the apparatus is not in operation, said means comprising springing means normally biasing the extrusion screw forwardly whereby the tip of the extrusion screw closes said exit means when the apparatus is not in operation and during operation said second helicoidal screw moves to push the tip of the shaft rearwardly to open said exit means.

* * * * *